United States Patent
Park et al.

(10) Patent No.: US 8,577,141 B2
(45) Date of Patent: Nov. 5, 2013

(54) METHOD OF ENHANCING CONTRAST USING BEZIER CURVE

(75) Inventors: Soo Jin Park, Seoul (KR); K. S. Krishna, Karnataka (IN)

(73) Assignee: LG Innotek Co., Ltd., Seoul (KR)

( * ) Notice: Subject to any disclaimer, the term of this patent is extended or adjusted under 35 U.S.C. 154(b) by 107 days.

(21) Appl. No.: 13/114,592

(22) Filed: May 24, 2011

(65) Prior Publication Data

US 2012/0114267 A1 May 10, 2012

(30) Foreign Application Priority Data

Nov. 5, 2010 (KR) .................. 10-2010-0110030

(51) Int. Cl.
 *G06K 9/00* (2006.01)
 *G06K 9/40* (2006.01)

(52) U.S. Cl.
 USPC ........................ 382/168; 382/254; 382/274

(58) Field of Classification Search
 USPC ......... 382/168–169, 274–275, 254, 162–163, 382/167; 358/3.26–3.27, 1.9; 348/25, 28, 348/30, 671–672; 345/428, 619
 See application file for complete search history.

(56) References Cited

U.S. PATENT DOCUMENTS

| | | | | |
|---|---|---|---|---|
| 6,259,472 B1 * | 7/2001 | Park | ............................. | 348/28 |
| 7,298,373 B2 * | 11/2007 | Vuylsteke | .................... | 345/428 |
| 7,298,383 B2 * | 11/2007 | Vuylsteke | .................... | 345/619 |
| 7,340,091 B2 * | 3/2008 | Lin | ............................. | 382/169 |
| 7,471,823 B2 * | 12/2008 | Ubillos et al. | .............. | 382/167 |
| 7,580,566 B2 * | 8/2009 | Fukuda et al. | .............. | 382/168 |
| 7,894,668 B1 * | 2/2011 | Boitano | ....................... | 382/168 |
| 8,265,391 B1 * | 9/2012 | Srinivasan et al. | .......... | 382/168 |
| 8,351,698 B2 * | 1/2013 | Furuya | ......................... | 382/168 |
| 2009/0185743 A1 * | 7/2009 | Qi | ............................... | 382/169 |
| 2011/0222767 A1 * | 9/2011 | Mitsunaga | ................... | 382/169 |
| 2011/0229019 A1 * | 9/2011 | Batur et al. | ................. | 382/159 |

* cited by examiner

*Primary Examiner* — Ishrat I Sherali
(74) *Attorney, Agent, or Firm* — Saliwanchik, Lloyd & Eisenschenk

(57) ABSTRACT

Disclosed is a method of enhancing contrast of an image by using a Bezier curve. Histogram distribution is calculated based on an image that has been photographed or read out from a storage medium, the type of the image is determined according to the contrast state of the image, the movement directions of control points of a 3-D Bezier curve is determined according to the type of the image, and the movement distances of the control points of the 3-D Bezier curve are calculated based on the number of luminance values of the histogram distribution. Two control points of the 3-D Bezier curve are moved based on the movement directions and the movement distances of the control points, and the 3-D Bezier curve is created by using the two moved control points and two fixed control points. The contrast of the image is enhanced by applying the Bezier curve.

5 Claims, 8 Drawing Sheets

FIG. 4A-E

METHOD OF ENHANCING CONTRAST USING BEZIER CURVE

CROSS-REFERENCE TO RELATED APPLICATION

This application claims the benefit under 35 U.S.C. §119 of Korean Patent Application No. 10-2010-0110030, filed Nov. 5, 2010, which is hereby incorporated by reference in its entirety.

BACKGROUND OF THE INVENTION

1. Field of the Invention

The present invention relates to a method of enhancing contrast of an image. More particularly, according to the present invention, histogram distribution is calculated based on an image that has been photographed or read out from a storage medium, the type of the image is determined according to the contrast state of the image, the movement directions of control points of a 3-D Bezier curve is determined according to the type of the image, and the movement distances of the control points of the 3-D Bezier curve are calculated based on the number of luminance values of the histogram distribution. Two control points of the 3-D Bezier curve are moved based on the movement directions and the movement distances of the control points, and the 3-D Bezier curve is created by using the two moved control points and two fixed control points. Then, the contrast of the image is enhanced by applying the Bezier curve.

2. Description of the Related Art

Contrast exerts a significant influence to image quality when a person visually recognizes an image. If the contrast of an image is enhanced, the image may be more easily interpreted and recognized by the person and may serve as "more appropriate input data" for other automatic image processing technologies. The main purpose of the image enhancement is to create an image more suitable for a given work and a specific observer by changing image attributes. Through such image processing, at least one attribute may be changed.

In general, image contrast is defined as the range of usable luminance intensities of a given image. The image contrast may be expressed through following equation 1 mathematically.

$$\text{Contrast} = (L\max - L\min)/(L\max + L\min) \quad \text{Equation 1}$$

Herein, the Lmax and Lmin represent the maximum luminance value and the minimum luminance value of the given image, respectively.

A contrast enhancement scheme is an image processing technology of making image features as more clear values by using the maximum range of luminance intensity provided by bit numbers used for the quantification of the luminance intensity.

Among contrast enhancement schemes having the above characteristics, a contrast enhancement scheme optimized to the eyes of the person is required.

BRIEF SUMMARY

An object of the present invention is to provide a method of enhancing contrast of an image in a spatial region in which the contrast of the image must be adaptively enhanced according to image types.

According to the embodiment of the present invention, there is provided a method of enhancing contrast of an image by using a Bezier curve. The method comprises reading an image, calculating distribution of luminance values of the image, calculating pixel counts according to low, middle, high luminance durations of the luminance values, determining a type of the image based on the pixel counts according to the low, middle, high luminance durations, determining movement directions of control points based on the type of the image, calculating movement distances of the control points based on the distribution of the luminance values of the image, moving the control points based on the movement directions and the movement distances of the control points and creating a 3-D Bezier curve based on the moved control points, and performing contrast enhancement by using the 3-D Bezier curve.

According to the present invention, the contrast enhancement of an image can be performed with a small computational amount in such a manner that the image can be more optimized to the eyes of a person.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments of the present invention will be described in more detail with reference to accompanying drawing.

Figure 1:
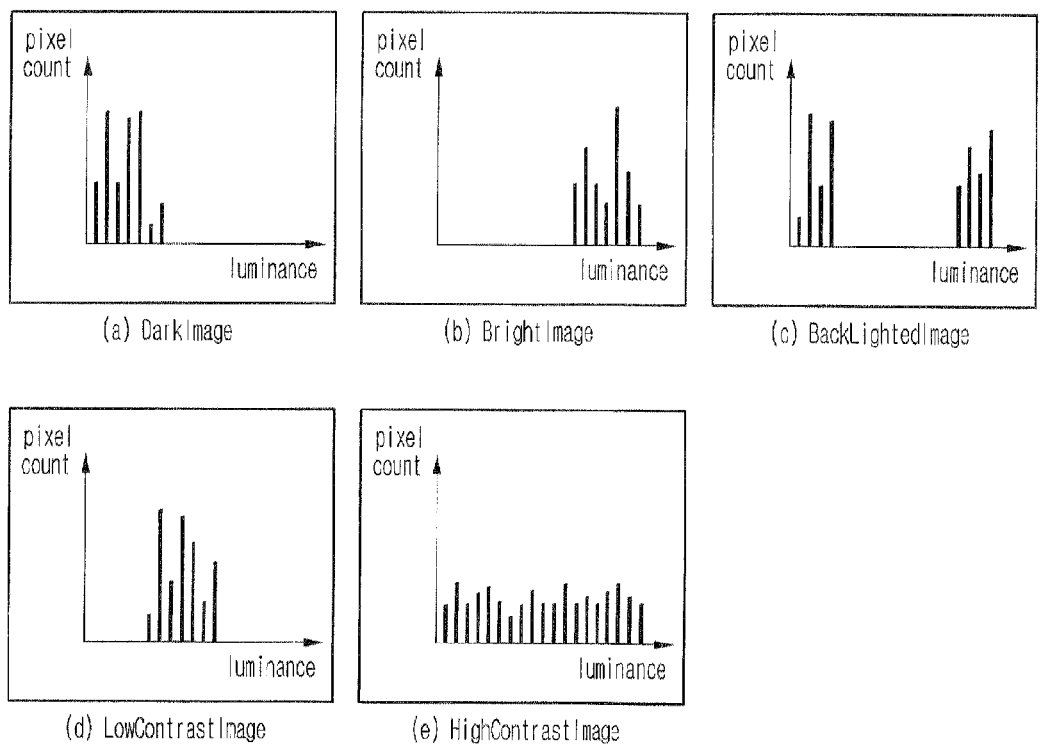
FIGS. 1A to 1E are graphs showing histogram distribution of luminance values of images according to the types of the images.

FIGS. 1A to 1E are graphs showing histogram distribution according to image types. In detail, FIG. 1A is a graph showing histogram distribution in a dark image, and FIG. 1B is a graph showing histogram distribution in a bright image. FIG. 1C is a graph showing histogram distribution in a back lighted image, and FIG. 1D is a graph showing histogram distribution in a low contrast image. FIG. 1E is a view showing histogram distribution in a high contrast image.

Figure 2:
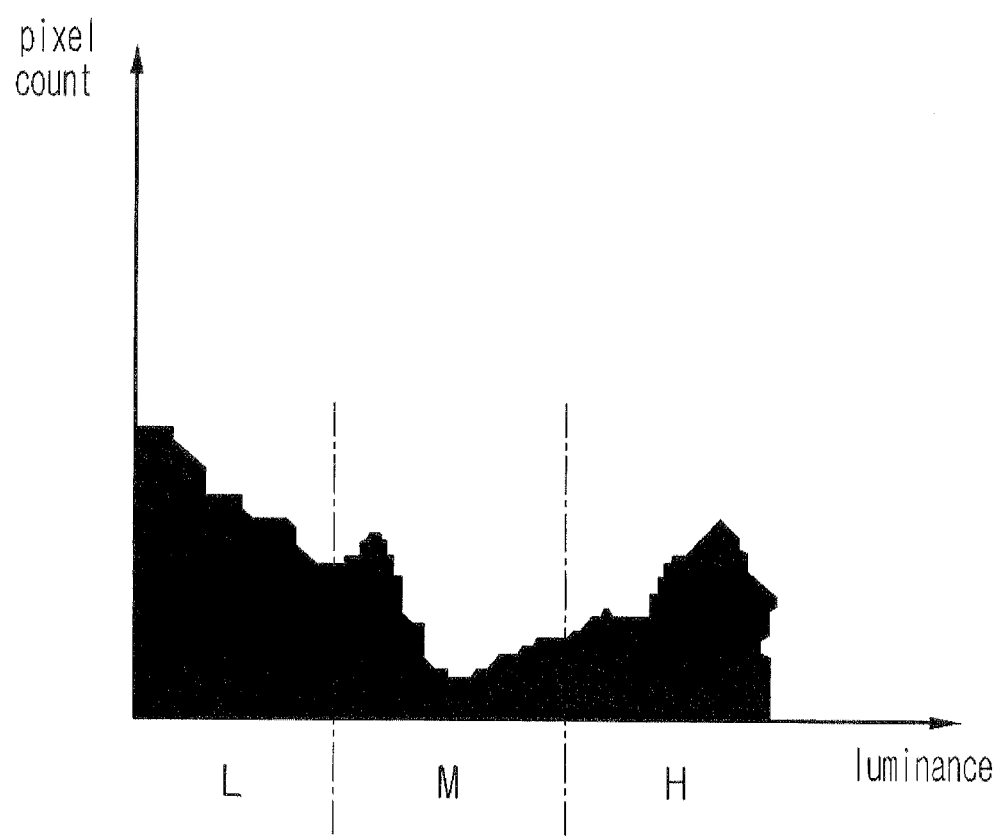
FIG. 2 is a graph showing histogram distribution of an image according to one embodiment of the present invention.

As shown in FIG. 2, the histogram distribution of an image is divided into three durations, that is, a low luminance duration L, a middle luminance duration M, and a high luminance duration H. Preferably, the lengths of the low, middle, and high luminance duration are identical to each other. In other words, the number of luminance values containing in the low, middle, and high luminance durations may be 85, 85, and 86, respectively, among 256 discrete luminance values.

Meanwhile, a Bezier curve is a parametric curve frequently used in computer graphics and related fields. The Bezier curve is extensively used in the computer graphics in order to model a smooth curve. According to the present invention, to enhance the contrast of an image, a 3-D Bezier curve is used.

The 3-D Bezier curve may be defined by following equation 2.

$$B(t)=(1-t)^3 P_0+3(1-t)^2 t P_1+3(1-t)t^2 P_2+t^3 P_3, t \in [0,1]$$  Equation 2

Herein, P0, P1, P2, and P3 are control points of the 3-D Bezier curve.

The 3-D Bezier curve is used to model the contrast enhancement problem for different scenarios in dynamic based on scenes or image contents. All curve shapes necessary for contrast enhancement can be obtained by changing the positions of control points. The shapes of the Bezier curve vary according to the positions of the control points.

Figure 3:
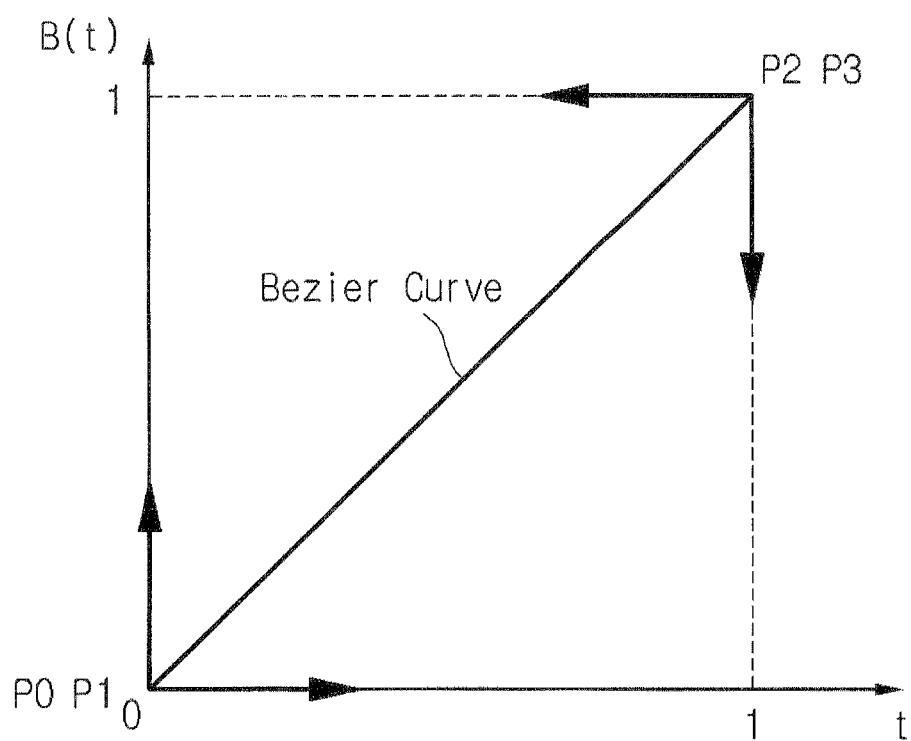
FIG. 3 is a graph showing a method of setting control points of a 3-D Bezier curve according to one embodiment of the present invention.

Hereinafter, a method of setting the positions of control points according to one embodiment of the present invention in order to obtain the curves used for contrast enhancement will be described. FIG. 3 is a graph showing the method of setting the control points of the 3-D Bezier curve according to one embodiment of the present invention.

The control points P0 and P3 among four control points P0, P1, P2, and P3 are fixed in a diagonal direction while facing each other. In other words, as shown in FIG. 3, the control points P0 and P3 are fixed at (0, 0) and (1, 1), respectively. The control points P1 and P2 are placed at the same positions of the control points P0 and P3, respectively, and are away from the control points P0 and P3 by distances determined according to pixel counts of three durations in the luminance value histogram distribution, that is, low, middle, and high luminance durations. Directions in which the control points P1 and P2 are away from the control points P0 and P3 vary according the image types.

The image types may be classified into five types as shown in FIGS. 1A to 1E, and the image types are determined according to pixel counts at each duration of the luminance value histogram distribution.

N(L), N(M), and N(H) represent pixel counts belonging to the low, middle, and high luminance durations, and are determined as follows.

If (N(L)>N(M)) && ((N(L)>N(H))) then a dark image;

Else If (N(H)>N(M)) && ((N(H)>N(L))) then a bright image;

Else If (N(L)>N(M)) && ((N(H)>N(M))) then a back lighted image;

Else If (N(M)>N(L)) && ((N(M)>N(H))) then a low contrast image;

Else a high contrast image.

Preferably, in order to classify an image into remaining image types except for a high contrast image, the difference between the sizes of the N(L), N(M), and N(H) must become 10% or more of the total pixel numbers of the image. In other words, the difference is made between the sizes of the N(L), N(M), and N(H), so that the image may be determined as another type of image other than the high contrast image in arithmetic. However, if the difference is not great, the image is preferably determined as a high contrast image. For example, if the total pixel number of an image is 1780, and N(L)=600, N(M)=590, and N(H)=590, the image may be determined as a dark image as described above. However, since the difference between the sizes of the N(L), N(M), and N(H) is not great, the image may be determined as a high contrast image. When the difference between pixel count numbers of the low, middle, high luminance durations is greater than or equal to 1780*10%=178, the image may be determined as another type of an image other than a high contrast image. The 10% is reference used to determine if the difference between pixel count numbers of the low, middle, high luminance durations is great. According to embodiments, the reference may be changed to 20%, 30%, etc.

Figure 4:
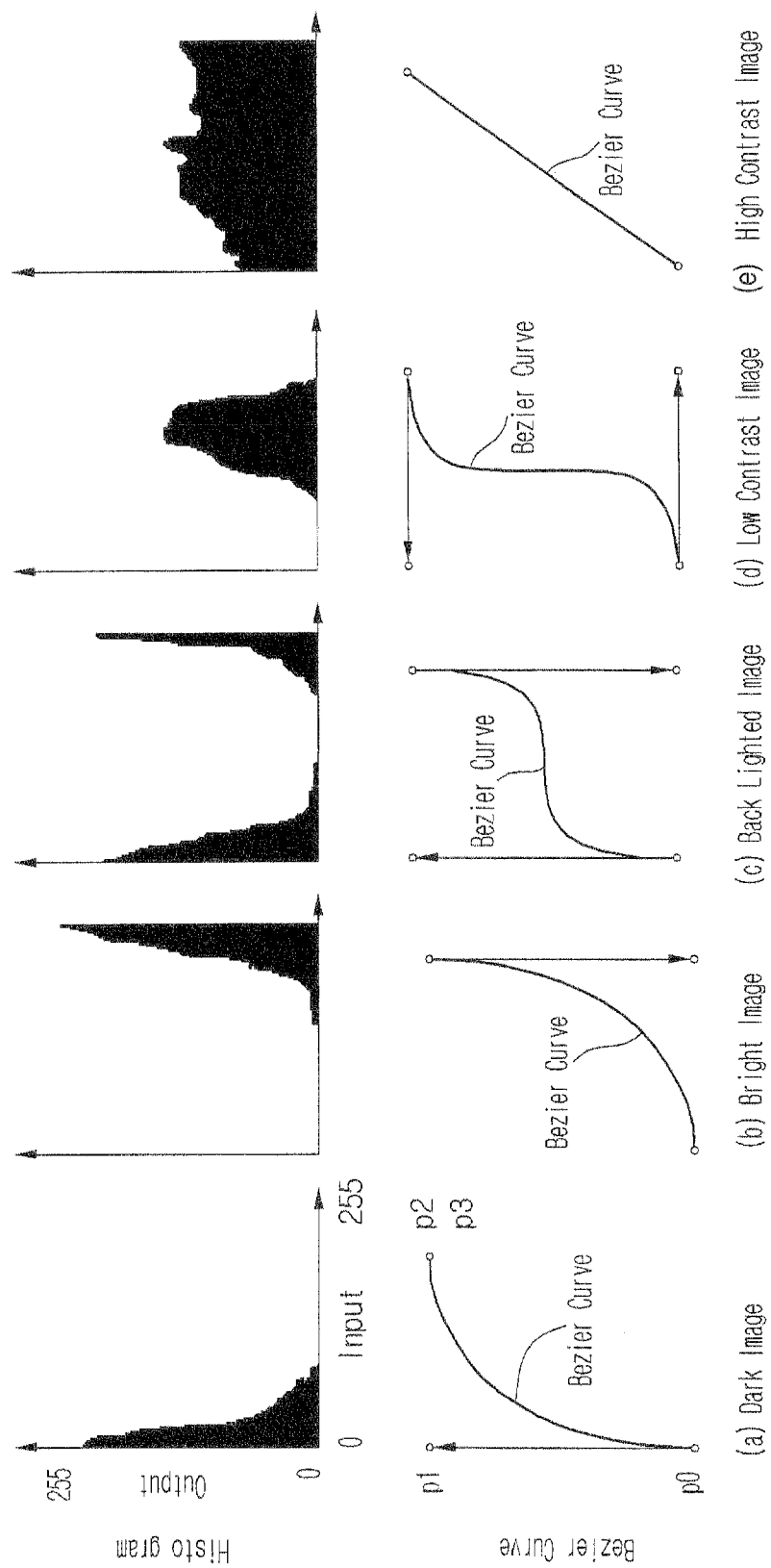
FIGS. 4A to 4E are graphs showing a method of moving control points according to image types according to one embodiment of the present invention.

Referring to FIG. 4, if an image is determined as a dark image of FIG. 4A, the control point P2 is fixed and has the same position as that of the P3, and the control point P1 moves upward. Accordingly, the Bezier curve may be created by the control points P0, P1, P2, and P3.

If the image is determined as a bright image of FIG. 4B, the control point P1 is fixed and has the same position as that of the control point P0, and the control point P2 moves downward.

If the image is determined as a back lighted image, the control points P1 and P2 move upward or downward, respectively.

If the image is determined as a low contrast image of FIG. 4D, the control point P1 moves rightward, and the control point P2 moves leftward.

If the image is determined as a high contrast image of FIG. 4E, the control points P0, P1, P2, and P3 do not move, and create a Bezier curve in the form of a straight line. If contrast enhancement is performed by using the Bezier curve in the form of the straight line, input values are identical to improved values, so that an image is not changed actually.

The movement distances of the control points P1 and P2 are determined according to the tonal contrast ratio of following equation 3.

$$\text{Tonal contrast ratio}(TC)=N/(L\max-L\min+1)$$  Equation 3

Herein, N, Lmax, and Lmin represent the number of luminance values existing in the luminance value distribution, the maximum luminance value of the luminance value distribution, and the minimum luminance value of the luminance value distribution, respectively.

Figure 5:
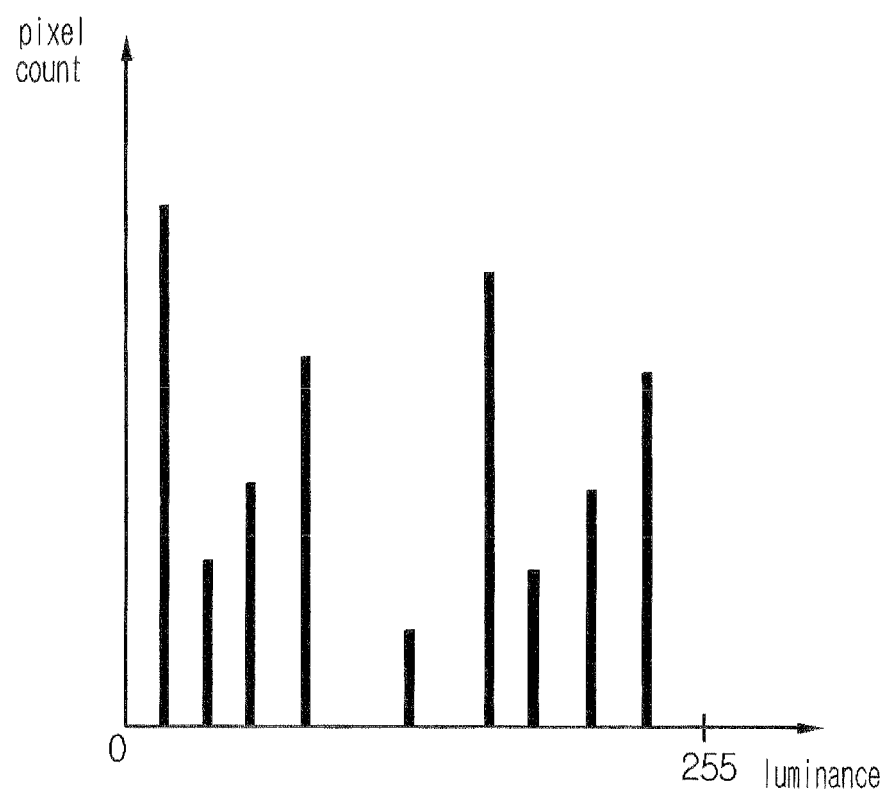
FIG. 5 is a graph showing the number N of luminance values in the histogram distribution of the luminance values according to one embodiment of the present invention.

Hereinafter, the number N of luminance values existing in the luminance value distribution will be described with reference to FIG. 5. On the assumption that the histogram distribution has been already calculated as shown in FIG. 5, pixel counts may not exist at all luminance values of 0 to 255, but may exist at only specific luminance values. As shown in FIG. 5, pixel counts are concentrated on nine luminance values. In this case, N=9. In addition, the N may be in the range of 1 to 256 with respect to a specific image.

The movement distances D of the control points P1 and P2 are determined by equation 4.

$$D=(2^N-1)*TC$$  Equation 4

For example, the type of a predetermined image may be determined as a back lighted image based on the histogram distribution of the image. In this case, if N=9, Lmax=240, and Lmin=5, the tonal contrast ratio (TC) is determined as the following value.

$$TC=9/(240-5+1)=0.038135 \qquad \text{Equation 5}$$

Since the image is a back lighted image, the control points P1 and P2 move upward and downward, respectively, and the movement distances thereof are determined as follows.

$$D=(2^9-1)*0.038135=9.72457 \qquad \text{Equation 6}$$

Therefore, the control points P1 and P2 move by the unit of about 9.72457, that is, the luminance value of 9.72457. In this case, in order to reduce a computational amount, the movement distances of the control points P1 and P2 may be rounded off to the nearest integer. For example, the control points P1 and P2 may move by 10 units obtained by rounding off 9.72457.

Figure 6:
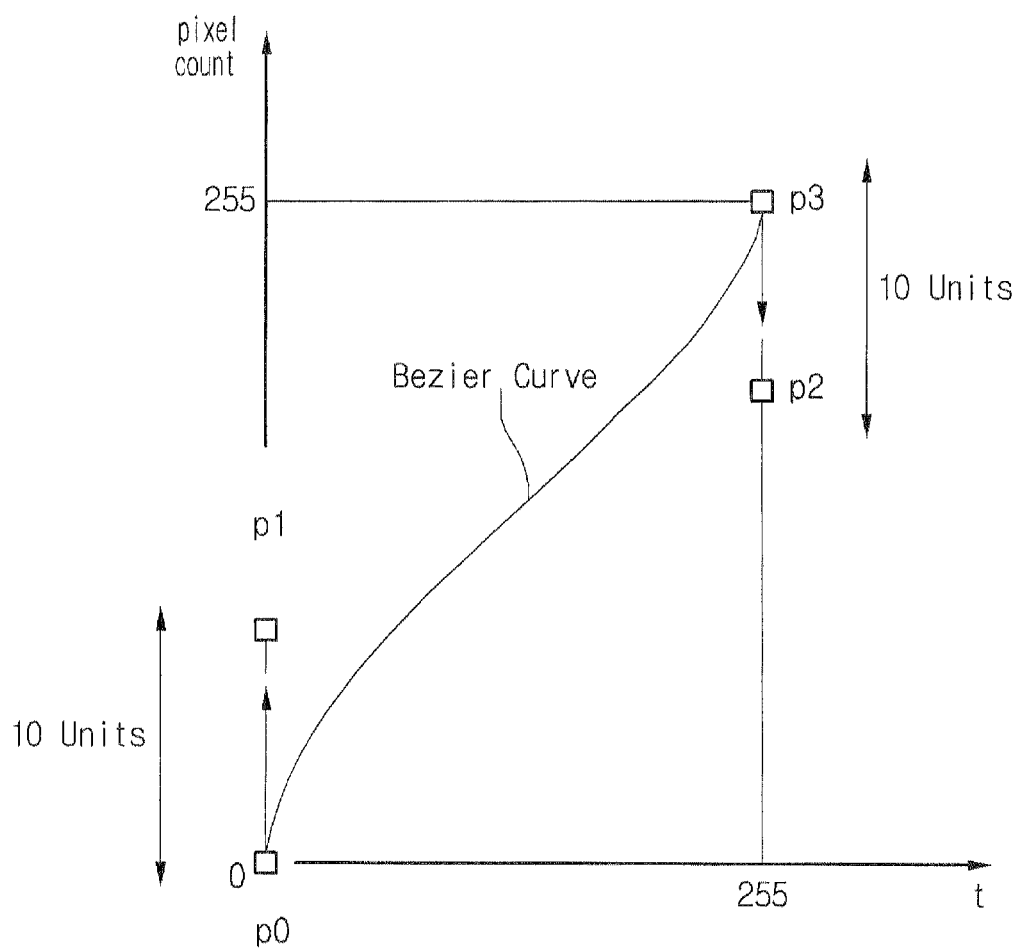
FIG. 6 is a graph showing a method of moving control points by a calculated distance according to one embodiment of the present invention.

As shown in FIG. 6, the control points P1 and P2 move upward and downward by 10 units. In FIG. 6, X and Y axes are scaled in [0,255]. If X and Y axes are scaled in [0,1], the control points P1 and P2 move upward and downward by a distance obtained by dividing the above calculated distance by 256.

Figure 7:
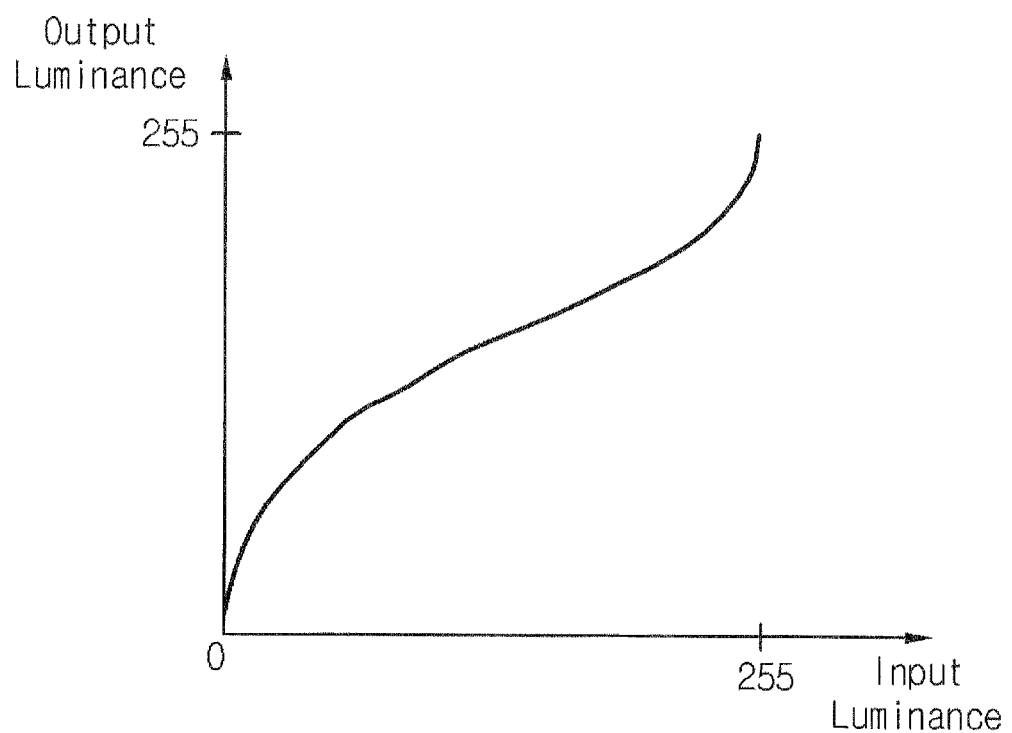
FIG. 7 is a graph showing a reference curve based on a Bezier curve obtained in the final stage according to one embodiment of the present invention.

A 3-D Bezier curve is created by using the four control points obtained through the above processes, and is shown in FIG. 7. In FIG. 7, an X axis represents an input luminance value, and a Y axis represents an output luminance value. Luminance values of a given image are mapped with new luminance values by using the reference curve of FIG. 7, so that the contrast of the image can be enhanced.

Figure 8:
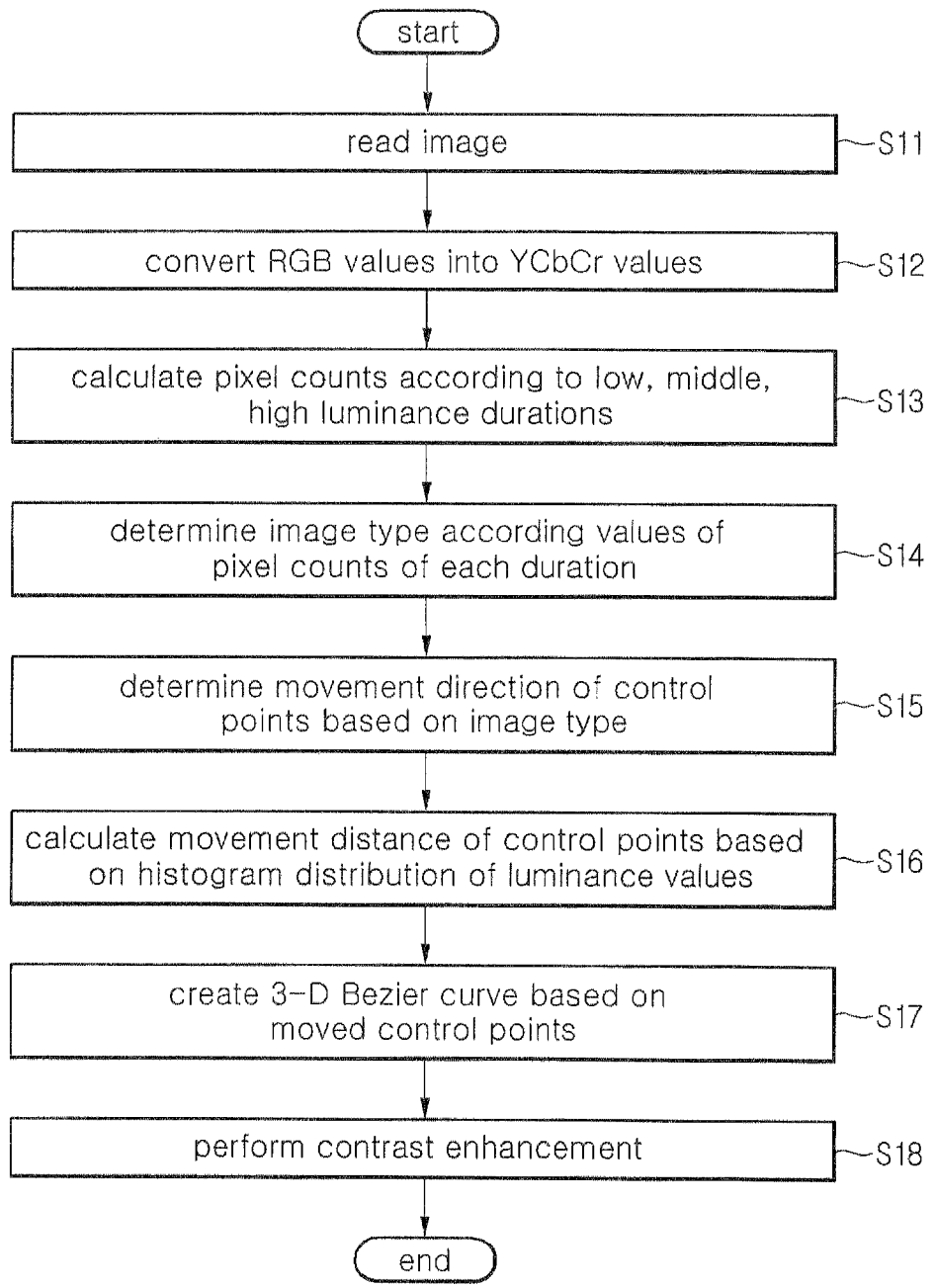
FIG. 8 is a flowchart showing a method of adaptively enhancing contrast of an image according to one embodiment of the present invention.

FIG. 8 is a flowchart showing the method of adaptively enhancing contrast of an image according to one embodiment of the present invention.

In step S11, an image is read. The image may have been photographed by a digital camera, or may have been read out from a storage medium.

In step S12, the RGB values of the image, which has been read, are converted into YCbCr values, and a Y value, which is a luminance component of each pixel, is extracted.

In step S13, pixel counts are calculated according to low, middle, and high luminance durations based on extracted Y values of pixels.

In step S14, the type of the image is determined based on the pixel counts according to the luminance durations. The type of the image may be one of five types of FIG. 4.

In step S15, the movement directions of the control points are determined based on the determined image type. As described above, the control points P0 and P3 are fixed at (0,0) and (1,1), and the control points P1 and P2 move upward or downward, and rightward or leftward, respectively.

In step S16, the movement distances of the control points P1 and P2 are calculated based on the histogram distribution of the luminance values. In this case, as described above, the number N of luminance values, at which pixel counts exist, among luminance values of 0 to 255 is extracted from the histogram distribution of luminance values, so that the movement distance can be calculated as described above.

In step S17, a 3-D Bezier curve is created based on the control points P1 and P2, which have been moved, and the control points P0 and P3 which have been fixed.

In step S18, contrast enhancement is performed by using the created Bezier curve or the reference curve scaled in the range of 0 to 255.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of enhancing contrast of an image by using a Bezier curve, the method comprising:
reading an image;
calculating distribution of luminance values of the image;
calculating pixel counts according to low, middle, high luminance durations of the luminance values;
determining a type of the image based on the pixel counts according to the low, middle, high luminance durations;
determining movement directions of control points based on the type of the image;
calculating movement distances of the control points based on the distribution of the luminance values of the image;
moving the control points based on the movement directions and the movement distances of the control points and creating a 3-D Bezier curve based on the moved control points; and
performing contrast enhancement by using the 3-D Bezier curve.

2. The method of claim 1, wherein the image is one of dark, bright, back lighted, low contrast, and high contrast images.

3. The method of claim 1, wherein, in the determining of the type of the image based on the pixel counts according to the low, middle, high luminance durations, the image is determined as a dark image if the pixel counts of the low luminance duration are greater than both of the pixel counts of the middle luminance duration and the pixel counts of the high luminance duration,
the image is determined as a bright image if the pixel counts of the high luminance duration are greater than both of the pixel counts of the low luminance duration and the pixel counts of the middle luminance duration,
the image is determined as a back lighted image if the pixel counts of the low luminance duration are greater than the pixel counts of the middle luminance duration, and if the pixel counts of the high luminance duration are greater than the pixel counts of the middle luminance duration,
the image is determined as a low contrast image if the pixel counts of the middle luminance duration are greater than both of the pixel counts of the low luminance duration and the pixel counts of the high luminance duration, or otherwise, the image is determined as a high contrast image.

4. The method of claim 1, wherein the calculating of the movement distances of the control points based on the distribution of the luminance values includes:

extracting a number (N) of luminance values existing in the distribution of the luminance values
calculating a tonal contrast ratio (TC) based on the number of the luminance values; and
calculating movement distances (D) based on the tonal contrast ratio (TC), and
wherein the tonal contrast ratio (TC) is determined through Equation 1, and the movement distances (D) are determined through Equation 2, $$TC = N/(L\max - L\min + 1) \quad \text{Equation 1}$$

$$D = (2^N - 1) * TC \quad \text{Equation 2}$$

in which the Lmax and Lmin represent maximum and minimum luminance values in the distribution of the luminance values, respectively.

5. The method of claim 4, wherein the control points move by an integer obtained by rounding off the calculated distances (D).

\* \* \* \* \*